Dec. 20, 1949     W. H. BENNETT ET AL     2,491,889
PRODUCTION OF COATED GLASS AND THE LIKE PRODUCTS
Filed Jan. 21, 1942     2 Sheets-Sheet 1
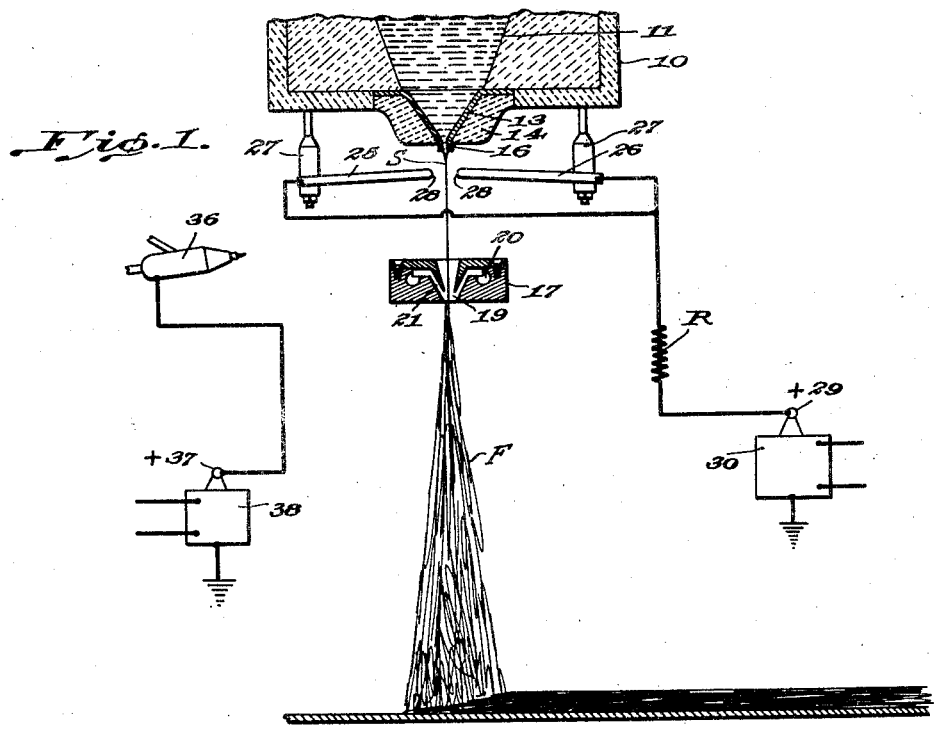
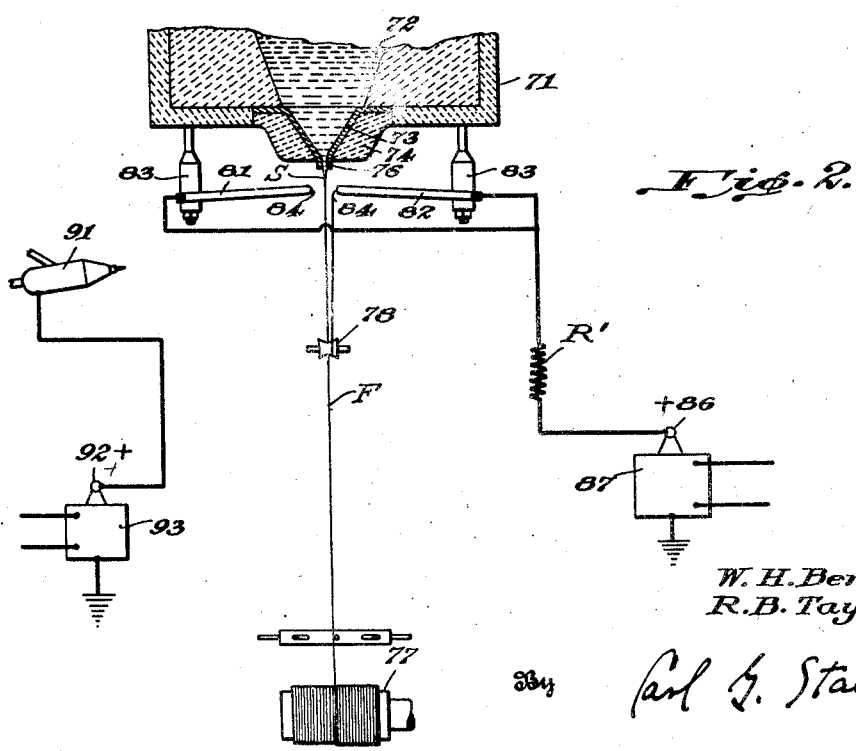
Inventors
W. H. Bennett and
R. B. Taylor,
By Carl G. Staelin
Attorney

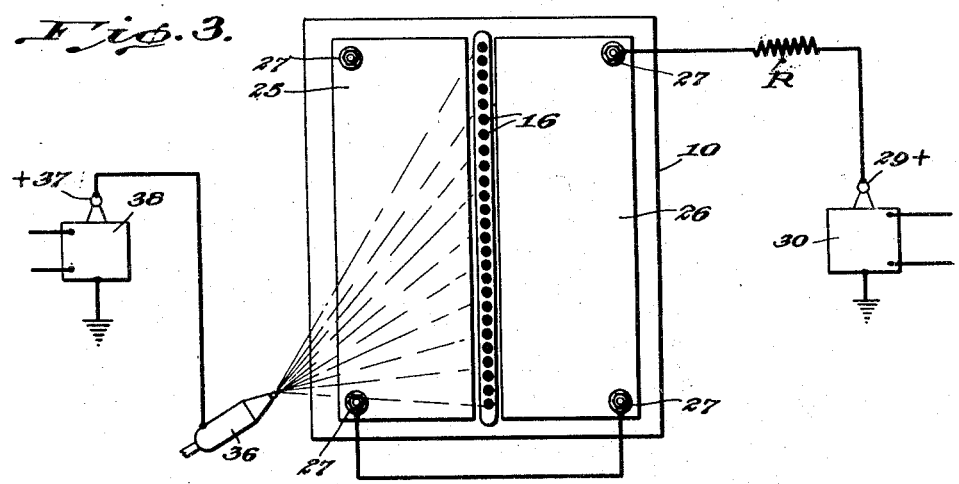
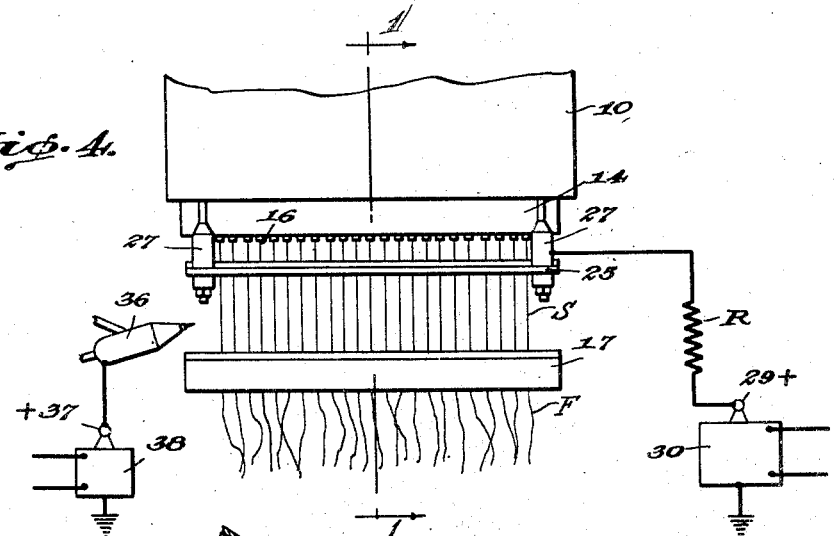
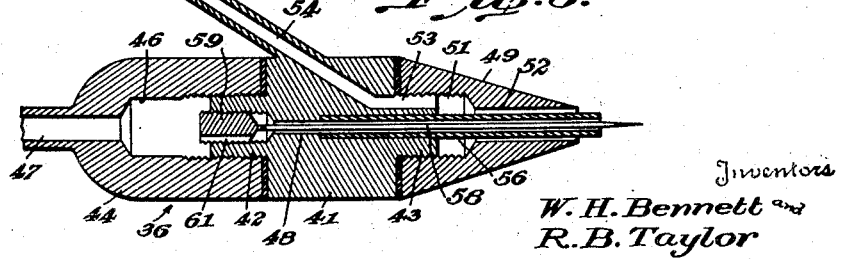
Inventors
W. H. Bennett and
R. B. Taylor
By Carl G. Staelin
Attorney Patented Dec. 20, 1949

2,491,889

UNITED STATES PATENT OFFICE 2,491,889

PRODUCTION OF COATED GLASS AND THE LIKE PRODUCTS

Willard H. Bennett and Robert B. Taylor, Newark, Ohio, assignors to Owens-Corning Fiberglas Corporation, a corporation of Delaware Application January 21, 1942, Serial No. 427,636

5 Claims. (Cl. 49—1)

1

This invention relates to a product having a predetermined uniform coating of material thereon and further relates to apparatus for making such a product.

The invention refers more particularly to the manufacture of glass or electrically similar materials and has as one of its principal objects to treat material of this type with a coating substance such, for example, as a suitable chemical, a lubricant or some decorative substance.

Another object of this invention is to electrostatically spray the desired substance on the material during conversion thereof into a finished product. In accordance with this invention, the spray particles and the material to be sprayed are electrostatically charged with charges of opposite polarities, so that the particles of the spray are attracted to the material. As a consequence, substantially all of the particles of the spray reach the material and the entire surface of the latter is covered with the fluid. Moreover the particles of the spray on the surface of the material spread over this surface until the electrostatic charges of the particles are neutralized by an equal number of the opposite charges on the surface of the material and this results in a uniform film on the material.

While it is not our intention to limit this invention to the application of any specific substance to materials being formed, nevertheless, it is pointed out that one outstanding use is to coat glass or other thermoplastic fibers with a lubricant or binder during the interval the fibers are being formed or immediately thereafter so as to reduce the abrasive characteristics of the surfaces of the fibers and also, if desired, to prevent accumulation of moisture on the fibers. One method of forming glass fibers, which has achieved considerable commercial success, is to continuously flow a stream of glass from a molten glass body and to draw this stream by means of a rotating drum into a very fine filament, which is solidified during its passage through the atmosphere. Such a process is described and claimed in the Slayter and Thomas Patent No. 2,234,986. In this method of forming glass or other inorganic fibers, it has become common practice to apply a coating to the fibers by drawing the latter over a coating-impregnated pad, which necessarily has to be spaced a sufficient distance from the molten portions of the fibers to enable the latter to be properly grouped before actually engaging the pad. Another method of producing fibers from thermoplastic materials is that of the Slayter and Thomas Patent No. 2,133,236. Here the streams of molten material are engaged by a gaseous blast from a blower and attenuated into fibers. In this method, a lubricant or the like is sprayed onto the fibers at a point beneath the blower. These procedures were not entirely satisfactory not only because moisture in the atmosphere collected on the fibers before the latter reached the pad or the blower but also because there was no assurance that the coating would spread uniformly over the entire surface of the fibers. As a consequence, when the fibers were brought in contact with each other, there was a tendency for the fibers to scratch and cut each other.

It is, therefore, a further object of this invention to apply the coating to the fibers while the latter are in a plastic or molten state before the fibers have an opportunity to cool sufficiently to accumulate any appreciable amount of moisture. This is accomplished by spraying the coating on the fibers at a point adjacent the bushings through which the molten material is drawn.

Another object of this invention is to insure the application of a film of uniform thickness on the fibers by electrostatically charging the particles of the spray with one polarity and by inducing an electrostatic charge of the opposite polarity on the fibers as the latter are attenuated from streams of molten material flowing from suitable bushings. It follows from the above that the electrostatic charge is induced on the fibers while the latter are in a plastic condition and this charge freezes on the fibers when the later solidify. As a result, the charge remains on the fibers for a sufficient period to enable the latter to be sprayed with a desired charged coating material.

There are numerous advantages resulting from electrostatically applying the coating to the fibers at points in close proximity to the bushings through which the fibers are drawn. As pointed out above, one advantage is that the coating is applied to the fibers before the latter cool sufficiently to accumulate moisture and this is desirable because it assists materially in increasing the film strength of the coating on the fibers. Another advantage is that the coating is spread over the fibers without the necessity of employing water emulsions of the lubricant or other aqueous mediums to assist in spreading the latter over the fibers. The application of water to freshly formed glass, for example, is objectionable because it seems to roughen the surface of the glass to such an extent that there is increased likelihood of the glass fibers cutting and scratching each other when brought into physical contact and, therefore, it is advantageous to eliminate aqueous constituents from the coating substance regardless of whether the latter is a lubricant or some other substance.

The foregoing, as well as other objects, will be made more apparent as this description proceeds, especially when considered in connection with the accompanying drawings, wherein:

Figure 1 is a diagrammatic view partly in section in the plane of the line 1—1 of Figure 4 showing one type of apparatus that may be successfully employed in carrying out the method of applying a uniform film on glass or other thermoplastic materials as they are formed into fibers;

Figure 2 is a diagrammatic sectional view of a like apparatus adapted to coating fibers produced by a different process;

Figure 3 is a bottom plan view of a part of the apparatus shown in Figure 1;

Figure 4 is a diagrammatic side elevational view of the apparatus shown in Figure 1; and Figure 5 is a longitudinal sectional view through the spray gun employed in connection with the apparatus shown in Figures 1 and 2.

For the purpose of illustration we have shown this invention as used in connection with the manufacture of glass fibers for applying a coating material on the fibers, although it will be apparent as this description proceeds that the principles involves herein may be satisfactorily employed in practically any case where it is desired to treat material by applying a fluid or other material thereon. The invention is particularly applicable to treating material as it is continuously formed by attenuation, extrusion, drawing or similar processes, into fibers, sheets, tubes or rods.

The material that may be treated in accordance with the present invention may be any that has electrical characteristics similar to glass in that it is conducting (in the same sense that glass is conducting) when plastic and that is relatively non-conducting (in the sense that glass is non-conducting) when solid. Such materials are difficult to charge electrostatically when in solid form because of the very high resistance to electric current and such charging must be by the use of emitters at a potential high enough to cause a corona discharge at the emitter. By the present process such materials preferably are charged at a time when they are in a conducting state and they are then solidified so that the charge is bound in the material. Most advantageously, the charging is accomplished in conjunction with the forming of the material into a finished object provided, of course, that the material passes through a plastic or fluid state during such forming.

The terms "conducting" and "non-conducting" as employed herein are used in the normal sense of the words, and are intended to designate the electrical characteristics of the material as usually defined. Thus, although conductance may vary greatly, conducting is meant to imply that a perceptible current flow takes place upon the existence of a relatively low potential as in the case of metals, carbon, electrolytes and similar materials. "Non-conducting" is employed herein in the sense that the material has such a high resistance to current flow that it in fact constitutes an insulator such as in the case of cotton, silk, glass, rubber, resin, and the like.

In the manufacture of glass or other thermoplastic fibers it is advantageous to protect the fibers with a film of coating substance before the fibers come into physical contact with each other or with any mechanism employed in handling the fibers. This is especially true of glass fibers or materials having the characteristics of glass because such materials have very high mutual abrasive qualities and have a tendency to cut or scratch each other during flexing or twisting.

It has been proposed to apply films to the fibers by causing the latter to contact an impregnated pad as they are grouped into a strand. This method proved objectionable because by the time the fibers contact the pad, a considerable amount of moisture condenses or otherwise is attracted to or accumulates on the fibers and prevents satisfactorily coating the fibers. Moreover, in performing the above method, water emulsions were oftentimes used with the coating substance to increase the spreading qualities thereof and this, of course, is objectionable because it results in bringing water in direct contact with the freshly formed fibers.

In another manner of treating the fibers, it has been proposed to spray a substance such as an oil in water emulsion directly on the fibers as the latter travel from the attenuating region. This method is not entirely satisfactory because a very small percentage of the relatively slowly moving spray particles impinge on the fibers moving at high speed and, as a result, the fibers were poorly and spottily lubricated. Moreover, as in the pad method of application previously mentioned, it is not feasible to apply the spray to the fibers immediately adjacent the bushing where the fibers are still sufficiently hot to prevent accumulation of moisture thereon so that the fibers are spottily lubricated.

This invention utilizes the spray method for coating the fibers but overcomes the objections to this method by electrostatically charging the fibers and particles of the spray with charges of opposite polarity. As a result, the particles of the spray are attracted to the fibers and the latter are not only completely coated but are also uniformly coated because the spray particles spread over the fibers until the charges in the particles are neutralized by the opposite evenly distributed charges on the fibers. Thus, the fibers may be safely coated with the desired material before the fibers have a chance to accumulate much moisture and before the fibers enter the blower or pass over the pad.

Reference will now be made more in detail to the drawing wherein the numeral 10 designates a furnace of the type employed in the manufacture of glass or other thermoplastic fibers. The furnace 10 has a well 11 adapted to receive the molten glass and communicates at its lower end with the interior of a bushing 13. The bushing is of platinum or precious metal alloy and is in the form of a V-shaped trough having the side walls extended downward below the bottom surface of a refractory block 14. One or more rows of small apertures or openings 16 extend through the bushing along the lower edge thereof. Each of he openings 16 permits a continuous flow of molten material therethrough in a small stream, as indicated in Figure 1 of the drawing. In practice the temperature of the material flowing through the bushing 13 is regulated by directly heating the bushing with a suitable electrical heating apparatus, not shown herein.

Beneath the bushing 13 is located a blower 17 comprising a body portion having a longitudinal slot 19 therethrough. Air or steam under pressure is conveyed in any suitable manner to pressure chambers 20 and this gas issues through channels 21 in the form of jets or sheets so that blasts of gas envelop and impinge on the small streams S of molten material which flow downwardly from the outlet openings 16 and pass through the slot 19. The streams are thus enveloped in a blast of gas moving downwardly at a high velocity and are drawn by the force of this blast into fibers or filaments F. These attenuated fibers or filaments normally preserve continuity with the molten streams flowing from the openings 16 and are cooled and solidified by the gaseous blasts and surrounding atmosphere while still integral with the streams. Thus the streams S properly are integral with and parts of or the same as the respective fibers or filaments F, but the word "streams" in the following description may be considered as the molten portions of the fibers.

In accordance with this invention, an electrostatic charge is induced on the streams as they issue from the openings 16. In general, the streams are electrostatically charged with one polarity by a pair of electrodes in the form of flat plates 25, 26 supported by means of insulated hangers 27 depending from the furnace 10. The plates are inclined slightly to the horizontal and have their inner edges at opposite sides of the streams in proximity to each other and to the bushing 13. The inclination of the plates brings the inner rounded edges 28 of the plates nearer the bushing to concentrate the charge on the electrodes at the inner edges. The electrodes or plates 25, 26 are electrically connected to each other and through a resistor R to the high potential terminal 29 of a suitable rectifier 30, connected in a usual supply circuit.

From the above construction it will be understood that the polarity of the electrostatic charge induced on the fibers or streams issuing from the openings 16 depends upon the polarity of the high potential terminal 29 of the rectifier 30. For example, if the high potential terminal is of negative polarity, the plates are also charged negatively and induce a positive charge on the streams or fibers. On the other hand, if the high potential terminal is of a positive polarity, as shown in the drawing, the plates acquire a charge of the same polarity and induce a negative charge on the streams of fibers. It follows from the above that an electrostatic charge of either polarity may be induced on the fibers by merely reversing the polarity of the high potential terminal 29.

The electrodes or plates 25, 26 induce the electrostatic charge of the selected polarity on the streams of material while the latter is in a plastic condition. This is advantageous in cases where the material being formed possesses the same electrical characteristics as glass, that is, the materials are relatively good conductors of electricity when heated to a molten or plastic condition but become a dielectric when cooled to a solidified state. It is much simpler and more satisfactory to induce the electrostatic charge on the material when the latter is in a state where it conducts electricity. It is simpler because less voltage is required to induce the desired charge on the material and it is more satisfactory because it has been found that the charge freezes or becomes bound on the surface of the formed objects, such as fibers, when the latter solidify. As a result, the charge is retained on the objects for a longer period of time and thereby enables them to be sprayed while in a charged condition. Moreover, in the case of fibers, due to the fact that all of the fibers are charged with the same polarity, adjacent fibers will repel one another and this is desirable because it results in maintaining the fibers in spaced relation during their formation and travel to a collecting zone and during the application of a coating material to the fibers.

Referring now more in detail to the manner in which an electrostatic charge of either polarity is induced on the streams of material and assuming that the electrodes or plates 25, 26 are charged with a negative polarity, the negative charge on the plates seems to repel electrons in the conducting portions of the streams and fibers and forces the electrons to flow in an upward direction back into the molten portion of the material in the furnace, leaving an electrostatic charge of positive polarity on the fibers. On the other hand, if a positive charge is put on the plates or electrodes, the electrons are drawn downwardly through the conducting portions of the fibers and the latter acquire a negative electrostatic charge. It will, of course, be understood that the thermoplastic material solidifies at a relatively fast rate after it leaves the bushing 13 and, therefore, the electrostatic charge freezes or becomes bound on the surfaces of the fibers.

In the specific embodiment of the invention shown in the drawings, an electrostatic charge of negative polarity is induced on the fibers. This arrangement is preferred because it has been found that considerably less voltage is required to induce a negative charge on the fibers. In fact, tests have shown that approximately twenty times as much voltage must be supplied to the electrodes to satisfactorily induce a positive charge on the fibers equivalent in density to a negative charge. This may be due to the fact that the hot bushing 13 emits thermal electrons that tend to neutralize the positive charge on the fibers.

The reduction of the voltage required to electrostatically charge the fibers is not only advantageous from an economical point of view but also because it enables the electrodes 25, 26 to be supported in relatively close relation to each other and to the bushing 13 without the danger of arcing between adjacent edges of the plates and between the latter and bushing. In the specific embodiment of the invention selected herein for the purpose of illustration, a voltage of approximately 500 volts applied to the plates 25, 26 is sufficient to induce a negative charge of satisfactory density on the fibers. This voltage is not critical and may be widely varied to suit different conditions.

This manner of charging is more fully described and is claimed in our copending application Serial No. 427,637, filed January 21, 1942, which has since become abandoned.

In accordance with this invention the electrostatically charged fibers are coated with desired substances, the film thus formed on the fibers being more uniform than any heretofore obtained, particularly if a charge is induced on particles of the substance which is of a polarity opposite the charge on the fibers. For example, if an electrostatic charge of negative polarity is induced on the fibers, a positive charge is induced on the particles so that these particles are attracted toward the fibers and are uniformly spread over the entire surface of the latter in their attempt to neutralize the naturally evenly distributed charge on the fibers.

As stated above, the particular fluid applied to the fibers will depend upon the treatment it is desired to give the fibers. In the specific embodiment of this invention, it is desired to apply a uniform coating over the entire surfaces of the fibers before the latter cool sufficiently to accumulate moisture from the atmosphere or before they are brought into contact with each other. Accordingly, the following description will stress the application of a lubricant preferably in the form of mineral oil or other moisture repellant or surface protecting material to the fibers with the understanding that the invention is equally applicable to the use of any substance, either a comminuted solid or a fluid material, that it is desired to apply to the fibers and having a charge induced thereon.

In the present instance, the lubricant is sprayed toward the fibers by a spray gun 36 electrically connected to the positive high potential terminal 37 of a rectifier 38 connected in a usual supply circuit. The spray gun 36 comprises a body portion 41 having externally threaded studs 42 and 43 at the opposite ends thereof. A nut 44 threaded on the stud 42 is recessed to form a chamber 46 beyond the end of the stud. The chamber 46 communicates with a suitable source of fluid through a conduit 47 connected to the nut 44 and also communicates with a bore 48 extending axially through the body 41. A nozzle 49 is threaded on the stud 43 and is formed with a chamber 51 having a reduced outlet passage 52 in alignment with the bore 48. The stud 43 is recessed at 53 to provide a passageway establishing communication between the chamber 51 and an air inlet conduit 54 connected to the body 41. The fluid flowing through the bore 48 is prevented from mixing with the air in the chamber 51 by a tube 56 sleeved in the bore 48 and extending through the air outlet passage 52 in concentric relation thereto. The arrangement is such that the air discharging from the annular space around the forward end of the tube 56 contacts the fluid discharging from the forward end of the bore 48 and atomizes this fluid to form a spray. Extending axially through the bore 48 is an electrode in the form of a needle 58. The forward end of the needle is pointed and projects beyond the corresponding end of the tube 56. The rear end of the electrode 58 is provided with a threaded enlargement 59, which threadedly engages the rear end of the bore 48 and is recessed at one side to provide a passage 61, which establishes communication between the bore 48 and the fluid chamber 46. It will be noted from Figure 5 that the electrode is sufficiently smaller in diameter than the bore 48 to enable the fluid from the chamber 46 to flow around the electrode to the discharge end of the spray gun. The spray gun itself is not claimed herein since it forms the subject-matter of our application Serial Number 427,638, filed January 21, 1942, which has since become abandoned.

The electrode 58 is electrically connected to the high potential terminal 37 of the rectifier 38 and accordingly is electrostatically charged with a charge of positive polarity. Therefore, the lubricant or other fluid sprayed from the gun is electrostatically charged with a charge of the same polarity.

Sufficient voltage should be supplied to the electrode by the rectifier 38 to cause a slight amount of corona at the point of the electrode. In the spraying of a lubricant such as mineral oil, it has been found that voltages in the range of 35 to 40 kv. and a corona current in the order of 50 microamperes is satisfactory for inducing a positive charge on the lubricant.

Figure 2 of the drawings illustrates the application of the present invention to the process of producing what are known as continuous glass fibers. In this process a usual glass furnace 71 is employed and is provided with a well 72 that contains molten glass. The well communicates with the interior of a bushing 73 held in place by a refractory block 74. The bushing is preferably of precious metal and is otherwise similar to the bushing 13 of Figure 1. The lower edge of the bushing is provided with orifices 76 through which the molten glass flows in the form of small streams and these streams are attenuated by means of a drum 77 rotating at high speed and adapted to wind the fibers thereon as they are formed. Intermediate the bushing and the drum a pad 78 having a concave surface is adapted to engage the fibers as they move toward the attenuating drum 77 and group them into a strand. Suitable coating or sizing agents are normally applied to the grouped filaments at the pad 78 by causing the agent to flow onto and over the pad.

One or more electrodes are arranged beneath the bushing in proximity thereto and closely adjacent the streams of molten glass as they flow from the bushing to induce a charge on the streams and fibers as they travel from the bushing. In the present case the electrodes are similar to those illustrated in Figure 1 and are in the form of flat plates 81, 82 supported on hangers 83 depending from the furnace and are inclined slightly to the horizontal so that their inner rounded edges 84 are nearer the bottom of the bushing. The plates 81, 82 are interconnected electrically and connected through a resistor $R_1$ to the high potential terminal 86 of a rectifier 87 supplied with electrical energy in usual manner. The voltages impressed on the electrodes and the relation of the electrodes to the glass streams and to the bushing may be the same as mentioned above in the description relating to Figure 1.

Beneath the electrodes and preferably above the pad 78, a spray gun 91 similar to the spray gun 36, is arranged to direct a spray of desired coating material onto the charged fibers as they move downwardly toward the attenuating drum. The gun 91 is electrostatically connected to the high potential terminal 92 of a rectifier 93 that is supplied with electrical energy in any suitable manner. The gun 91 and rectifier 93 may be similar in all respects to the gun 36 and rectifier 38 illustrated in Figure 1.

In both the above applications of the invention, the spray guns 36 and 91 are supported in a position to direct the particles of the spray toward the fibers as they are formed from the streams issuing from the bushing 13 in such a manner that the spray particles engage the fibers in a region beneath the electrodes. Inasmuch as the streams are electrostatically charged with a charge of negative polarity and the particles of the spray are charged with a charge of positive polarity, the particles of the spray are attracted to the fibers. In this connection it may be pointed out that inducing a positive electrostatic charge on the particles of the spray not only causes these particles to collect on the oppositely charged fibers but also assists in breaking up the fluid to form a fine spray. This is probably due to the fact that the mutual repulsion of the charged spray particles acts to tear or break up the particles into smaller units. In other words, the electrostatic charge on the spray material assists in atomizing this material and thereby contributes further to coating the fibers with a uniform film of lubricant. It is also important to note that the particles of lubricant sprayed on the fibers tend to spread along the fibers during neutralization of the opposite charges on the particles and fibers.

The charge on the streams and fibers manifests itself at a point immediately beneath the bushing and its present on the fibers for a reasonable time interval, the length of which depends upon the density of the charge originally induced on the fiber and upon other factors such as the humidity of the air, the relation of the fibers to couducting grounded bodies and the like. Thus the coating material may be directed onto the fibers at any point along their length although it is, of course, desirable to apply the coating as soon as possible for several reasons. Application of the coating as soon as the fibers have cooled sufficiently to prevent ignition or volatilization of the coating material limits as far as possible the accumulation of moisture on the fiber surfaces. Also in the process illustrated in Figures 1 and 2, the application of the coating material in a region above the attenuating blower 17 or the pad 78 assures that the fiber surfaces are protected by the coating material as the fibers pass through the blower or over the pad. It is possible to apply the coating material either above or below the electrodes 25, 26 and 81, 82 but in the application of many coating materials such as lubricants, for example it is preferable to arrange the electrodes in shielding relation to the bushing as disclosed in the drawings and thereby guard against deposition of the coating material on the bushing.

Thus, from the foregoing it will be observed that the fibers may be sprayed with the lubricant before they cool sufficiently to accumulate moisture from the atmosphere. It will also be noted that the fibers are not only completely coated with the lubricant but are uniformly coated as well. This is desirable because it reduces the abrasive characteristics of the fibers to a minimum and thereby prevents the fibers from cutting or scratching one another when they come into physical contact with each other or with any part of the fiber forming mechanism.

Where desired, fluids other than lubricants may be applied to the fibers. By the present process, dyes, binding materials, decorative finishes, and the like in fluid or solid form may be charged and sprayed onto the charged fibers. Instead of spraying, the fibers may be caused to pass through a chamber containing a fog of charged substances or may be projected or deposited after their attenuation through or into a bath of charged coating material.

While particular stress has been placed upon electrostatically coating fibers, nevertheless, it should be understood that the present invention may be advantageously used in any instance where it is desirable to chemically treat or coat thermoplastic materials having the electrical characteristics of glass, while they are being attenuated, extruded or otherwise formed into desired configuration regardless of whether these materials are formed into fibers, sheets or objects of other shapes, and various modifications may be made in the herein described invention within the scope of the claims.

We claim:

1. The combination of a container for molten glass having an outlet opening through which the glass from the container flows in a stream, electrodes supported at opposite sides of the glass stream adjacent the delivery side of the opening, means for electrostatically charging the electrodes with a charge of positive polarity for inducing a negative charge on the glass, a spray gun supported to one side of the stream of glass and arranged for spraying a substance onto the glass stream in the region at the side of the electrodes opposite to the container, and means for electrostatically charging the particles of the spray from the gun with a charge of positive polarity .

2. The combination of a container for molten glass having an outlet opening through which the glass from the container flows in a stream, means spaced from the container for attenuating said stream into a fiber, electrodes supported at the side of the molten glass stream and in proximity to the outlet opening of the container, a spray gun arranged to direct a spray of coating material onto the fiber in the region between the electrodes and the attenuating means, and means for electrostatically charging said electrodes and the spray from said gun to the same polarity.

3. The combination of a container for molten glass having an outlet opening through which the glass from the container flows in a stream, a blower spaced from the container and arranged to direct a gaseous blast onto said stream for attenuating said stream into a fiber, electrodes in the form of a pair of flat plates supported one at each side of the molten glass stream and in proximity to the outlet opening of the container, a spray gun arranged to direct a spray of coating material onto the fiber in the region between the electrodes and the blower, and means for electrostatically charging said electrodes and the spray from said gun to the same polarity.

4. The combination of a container for molten glass having an outlet opening through which the glass from the container flows in a stream, a rotating drum spaced from the container for attenuating said stream into a fiber, electrodes supported one at each side of the molten glass stream and in proximity to the outlet opening of the container, a spray gun arranged to direct a spray of coating material onto the fiber in the region between the electrodes and the rotating drum, and means for electrostatically charging said electrodes and the spray from said gun to the same polarity.

5. The combination of a container for molten glass having a plurality of outlet openings through which the glass from the container flows in a plurality of closely adjacent streams, means spaced from the container for attenuating said streams into fibers, electrodes in the form of a pair of substantially horizontally disposed flat plates supported one at each side of the molten glass streams and in proximity to the outlet opening of the container, a spray gun arranged to direct a spray of coating material onto the fibers in the region between the electrodes and the attenuating means, and means for electrostatically charging said electrodes and the spray from said gun to the same polarity.

WILLARD H. BENNETT.
ROBERT B. TAYLOR.

REFERENCES CITED

The following references are of record in the file of this patent:

UNITED STATES PATENTS

| Number | Name | Date |
|---|---|---|
| 705,691 | Morton | July 29, 1902 |
| 946,179 | Weiskoff | Jan. 11, 1910 |
| 1,427,014 | Pazsiczky | Aug. 22, 1922 |
| 1,854,475 | Littlefield | Apr. 19, 1932 |
| 1,899,056 | Powell | Dec. 28, 1933 |
| 2,022,750 | Toohey | Dec. 3, 1935 |
| 2,048,651 | Norton | July 21, 1936 |
| 2,199,087 | Drill et al. | Apr. 30, 1940 |
| 2,206,058 | Slayter et al. | July 2, 1940 |
| 2,215,061 | Alt | Sept. 17, 1940 |
| 2,224,149 | Fisher | Dec. 10, 1940 |
| 2,224,274 | Powers | Dec. 10, 1940 |
| 2,234,986 | Slayter et al. | Mar. 18, 1941 |
| 2,251,726 | Wellech et al. | Aug. 5, 1941 |
| 2,270,341 | Ransburg | Jan. 20, 1942 |
| 2,293,165 | Norton | Aug. 18, 1942 |
| 2,302,289 | Bramston-Cook | Nov. 17, 1942 |

FOREIGN PATENTS

| Number | Country | Date |
|---|---|---|
| 478,334 | Great Britain | Apr. 8, 1936 |